Figure 1:
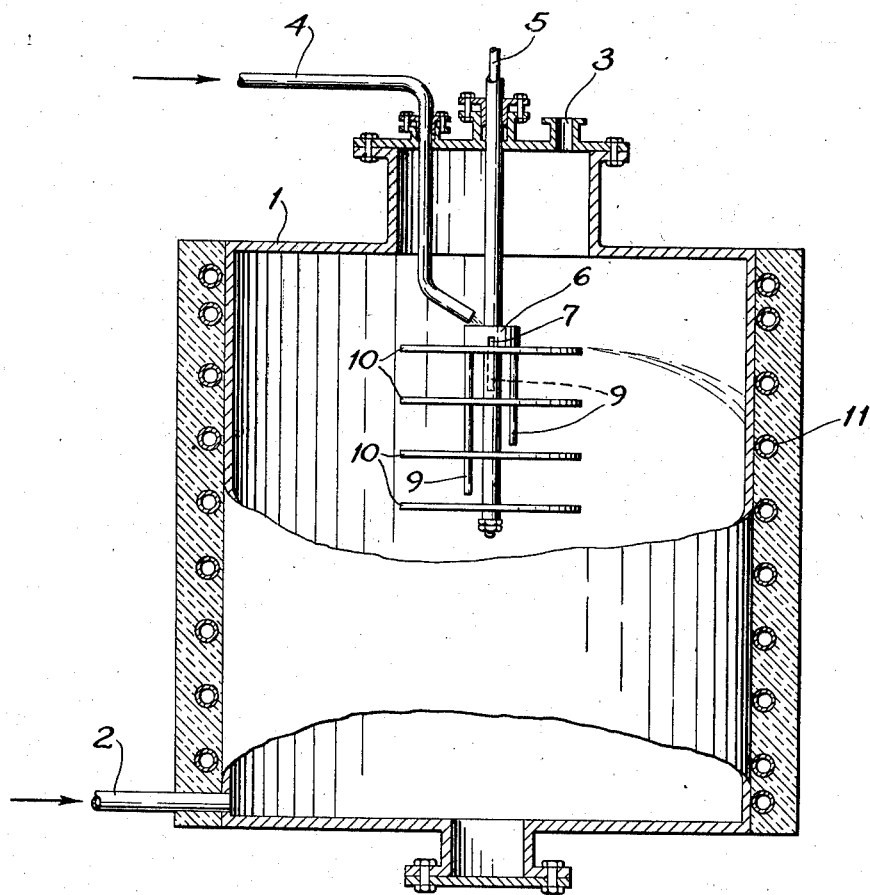

Oct. 7, 1941.   W. COOPEY   2,258,445
APPARATUS FOR VAPORIZATION
Filed Feb. 6, 1940   2 Sheets-Sheet 1

Walter Coopey
INVENTOR

BY Allan R Plumley
ATTORNEY

Oct. 7, 1941.  W. COOPEY  2,258,445
APPARATUS FOR VAPORIZATION
Filed Feb. 6, 1940  2 Sheets-Sheet 2
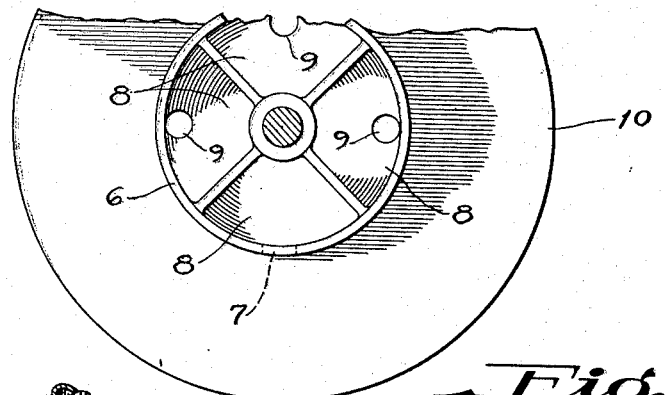
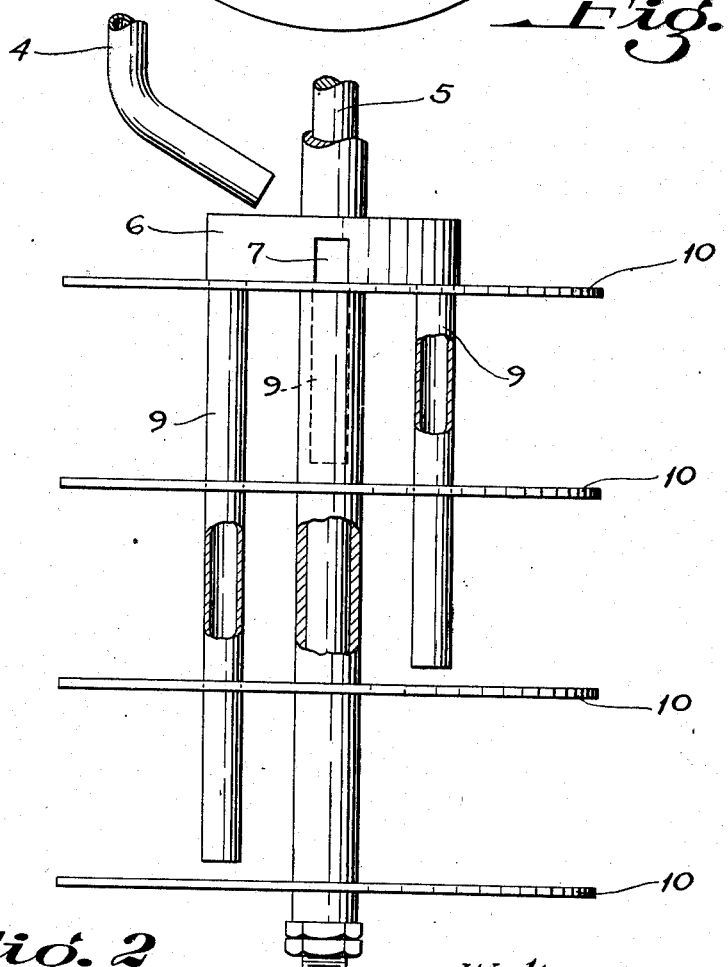
Walter Coopey
INVENTOR
BY
ATTORNEY Patented Oct. 7, 1941

2,258,445

UNITED STATES PATENT OFFICE 2,258,445

APPARATUS FOR VAPORIZATION

Walter Coopey, Charleston, W. Va., assignor to E. I. du Pont de Nemours & Company, Wilmington, Del., a corporation of Delaware Application February 6, 1940, Serial No. 317,513

3 Claims. (Cl. 299—63)

This invention relates to continuous vaporization apparatus and processes, and particularly to apparatus adapted to furnish extensive area for and short time of heat transfer.

Various organic compounds, such as petroleum, certain fatty acids, and the like have a tendency to become unstable, to carbonize, and to undergo undesired side and decomposition reactions at temperatures approaching their atmospheric boiling points. Thus, to illustrate, adipic acid, in common with many other high boiling organic compounds such as mentioned, has a tendency to become unstable and to undergo severe decomposition reactions at temperatures approaching its atmospheric pressure boiling point. For example, Aschan (Ann. 383, 58 (1911)) has studied the distillation of adipic acid under atmospheric pressure in the presence of carbon dioxide and found that anhydride formation does not occur to any appreciable extent, and that the acid is degraded in part to cyclopentanone and in part to δ-4,5-pentenoic acid. Atmospheric pressure distillation of adipic acid is accompanied not only by the formation of the above transformation products, but the liquid in the flask rapidly undergoes carbonization and will eventually char.

The common method of avoiding degradation reactions in cases such as those above described is to carry out the vaporization under diminished pressure but this procedure, although it may be suited to the laboratory, is not adapted for commercial practice which involves large installations of apparatus.

In copending application Serial No. 232,503 of Greenewalt et al., a method is described for overcoming degradation reactions wherein adipic acid is brought into thermal contiguity with a heat transfer medium maintained at a temperature above the boiling point of the acid, the heat transfer medium being characterized by having a capacity for transferring heat to the acid in an amount in excess of that required for complete vaporization of the acid within a period of time short of that required to produce appreciable decomposition of the acid. In this copending application, disclosure is made of an apparatus for carrying out this method wherein to a whirling or rotating distributing dish there is conducted the molten acid to be vaporized. Upon conduction to this whirling dish the acid rapidly travels across the surface and is thrown in the form of fine droplets to the walls of the vaporizing vessel within which the whirling dish is mounted. Upon contact with the heated walls of the vaporizing vessel the fine droplets are instantaneously vaporized and in such a manner as to avoid decomposition.

There are, however, certain limitations inherent in the single dish distributor of the Greenewalt et al. device, outstanding among which is the fact that the capacity of a single distributing device is limited. Another limiting factor is that a part only of the total area of the vaporizing vessel walls is utilized for vaporizing the liquid droplets. This is so because, as it whirls, the distributing dish throws a fan-like spray of droplets against only a part of the walls of the vaporizing vessel. Reference to the drawing of this invention and the therein indicated path of droplets from a single disc will clearly illustrate this limitation inherent in the single dish distributor.

It is an object of this invention to overcome the disadvantages of the prior art and to provide an apparatus for continuous volatilization of volatilizable compounds. Another object is to provide an apparatus for vaporizing organic compounds, characterized by being capable of operation over extended periods of time. A further object is to accomplish the vaporization of organic compounds, such specifically as adipic acid, under atmospheric pressures, while substantially avoiding the formation of decomposition products and occurrence of side reactions. Other objects will appear hereinafter.

These objects are accomplished, according to the present invention, by bringing the material to be vaporized into thermal contiguity with a heat transfer medium maintained at a temperature above the boiling point of the material to be vaporized and, more specifically by bringing the material to be vaporized into such heat transfer relationship in a plurality of contact areas.

The plurality of contact areas referred to are set up, preferably, by the distributive action of a number of whirling or rotating vanes, conveniently in the form of discs, to each of which, by individual feed conduits, there is conducted a stream of the material to be vaporized. These rotating vanes throw a fan-like spray of droplets against the walls of the vaporizing vessel, and in this manner, the greater part of the heat transfer area within the vaporizing vessel enclosing the rotating vanes may be utilized, augmenting to a high degree the overall capacity of the vaporizer.

The preferred embodiments of the invention are more clearly defined in the following selected example which, together with the accompanying drawings, is to be regarded as illustrating but in no way as limiting the invention.

Figure I represents the complete vaporizing device.

Figure II is an enlarged elevational view of the liquid sprayer of this invention.

Figure III is a sectional plan view of Fig. II taken along the top edge of cup 6.

From each compartment 8 of the distributing cup 6 a conduit 9 (Figures I, II and III) leads directly to the surface of a series of vanes 10 which are all affixed to the main vertical shaft 5.

The vessel 1 may be surrounded by electrical, gas, or other heating means 11.

A device for vaporizing adipic acid is constructed approximately as follows: A cylindrical vessel 1 about 2½ feet in length and 16 inches in diameter, mounted vertically, is provided with a gas inlet 2 at the bottom, a vapor outlet 3 2 inches in diameter located in the head and each end is sealed with heavy Van Stone-type closures. To the center of the top cover is bolted a suitable stuffing box assembly in which a power driven shaft 5 is operated. To the shaft 5, which extends to a point about 14 inches above the bottom of the vessel 1, are attached flat metal disks 10 6 inches in diameter and $\frac{1}{16}$ inch thick.

These discs 10 are attached to the vertical shaft 5 at intervals of 3 inches, beginning at about 4 inches from the inside of the top cover.

Integral with and affixed to the top disc 10 there is mounted, on the shaft 5, a metal cup 6 2½ inches in diameter and with a rim one inch in depth, having a narrow slot 7 about ¼ inch wide in the rim. This slot opens directly upon the top disc 10 and leads from one compartment of the 4 equal compartments 8 into which the metal cup 6 is divided. From each of the remaining three compartments 8 of the slotted (7) dish 6, conduits 9 lead directly to the lower three discs 10.

In operation, material to be vaporized is led by a conduit 4 to the distributing cup 6 where, as the cup revolves, equal amounts of material are deposited in each of the four compartments 8. From these compartments the material is thereafter led by the slot 7 and the conduits 9 respectively, to the four revolving discs 10 from which it is thrown, by centrifugal force, in the form of fine droplets against the heated walls of the vessel 1. The entire vaporizing vessel 1 is provided with facilities for heating to temperatures in the neighborhood of 350° C. or higher.

Although vaporization of adipic acid has been selected for detailed description as an illustration of the use of this invention, it should be understood that the apparatus may be advantageously used in vaporization operations generally.

The following is typical of the operation of this device. The cylindrical vessel 1 is heated to a temperature of 350° C., and ammonia gas preheated to a temperature of 500° C. is introduced at the rate of 1785 g./hr. through the gas inlet tube 2 at the bottom. Molten adipic acid is pumped in at the rate of 958 g./hr. through a small inlet tube 4, which extends to a point just above the rim of the rotating cup 6. The shaft 5 and cup 6 are operated at a speed of approximately 200 R. P. M.

The acid travels in equal quantities into the compartments 8 of the rotating cup 6 and thence through the slot 7 and the conduits 9 to the surfaces of the rotating discs 10. The acid travels rapidly across the surfaces of the discs 10 and is distributed evenly to the walls of the vaporizing tube 1 in fine droplets. Upon coming in contact with the walls these droplets are vaporized instantaneously without charring.

The resulting vapor mixture of adipic acid and ammonia is passed through the outlet pipe 3 to a water scrubbing column not shown where it is dissolved completely to form a solution of ammonia and ammonium adipate. Less than 0.5% of carbonaceous material is deposited in the vaporizing tube.

In the application of this invention to adipic acid vaporization, it is desirable to maintain the heat transfer medium at a temperature of at least 25° C. above the boiling point of adipic acid, which is about 312° C. at atmospheric pressure. The exact temperature to be used will be determined to a considerable extent by the type of apparatus employed. As pointed out previously, adipic acid is very unstable at its atmospheric presure boiling point. As a consequence, it is exceedingly important that the vaporization shall be accomplished within the space of a very few seconds in order to avoid such decomposition.

Although in the foregoing example certain specific embodiments for carrying out the invention have been described, it will be obvious to one skilled in the art that many modifications and variations thereof can be employed without departing from the spirit and scope of the invention. For example, this invention may be carried out with or without the use of a carrying gas. Thus, although ammonia has been shown in the example, other carrier gases such as nitrogen or carbon dioxide may be advantageously employed. Furthermore, although but one distributing cup has been described in the example and detailed description of this invention, a number of distributing cups as well as a greater number of revolving vanes may be used if desired.

I claim:

1. In a vaporizing chamber of an apparatus for vaporization, a rotatable, vertical shaft mounted within the vaporizing chamber, said shaft bearing a plurality of concentrically mounted vanes and, above the uppermost vane, a coaxially disposed distributing cup divided into as many compartments as there are vanes, each compartment being connected with a conduit leading to the upper surface of a different one of said vanes; and a conduit leading from a source of material to be vaporized and arranged to deliver said material into the rotating compartments of the distributing cup.

2. In a vaporizing chamber of an apparatus for vaporization, a rotatable, vertical shaft mounted within the vaporizing chamber, said shaft bearing a plurality of concentrically mounted vanes and, above the uppermost vane, a coaxially disposed distributing cup divided into as many equal compartments as there are vanes, each compartment being connected with a conduit leading to the upper surface of a different one of said vanes; and a conduit leading from a source of material to be vaporized and arranged to deliver said material into the rotating compartments of the distributing cup.

3. In a vaporizing chamber of an apparatus for vaporization, a rotatable, vertical shaft mounted within the vaporizing chamber, said shaft bearing a plurality of concentrically mounted vanes and mounted on the uppermost vane a coaxially disposed distributing cup divided into as many equal compartments as there are vanes, each compartment being connected with a conduit leading to the upper surface of a different one of said vanes; and a conduit leading from a source of material to be vaporized and arranged to deliver said material into the rotating compartments of the distributing cup.

WALTER COOPEY.